United States Patent
Hoffmann

(10) Patent No.: US 10,873,948 B2
(45) Date of Patent: Dec. 22, 2020

(54) SUSTAINABLE SERVICE SELECTION

(71) Applicant: Nokia Solutions and Networks Oy, Espoo (FI)

(72) Inventor: Klaus Hoffmann, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/482,733

(22) PCT Filed: Feb. 3, 2017

(86) PCT No.: PCT/EP2017/052311
§ 371 (c)(1),
(2) Date: Aug. 1, 2019

(87) PCT Pub. No.: WO2018/141393
PCT Pub. Date: Aug. 9, 2018

(65) Prior Publication Data
US 2020/0213992 A1    Jul. 2, 2020

(51) Int. Cl.
| | | |
|---|---|---|
| H04W 28/24 | (2009.01) | |
| H04W 16/02 | (2009.01) | |
| H04W 24/10 | (2009.01) | |
| H04W 72/04 | (2009.01) | |
| H04W 4/50  | (2018.01) | |
| H04W 72/08 | (2009.01) | |

(52) U.S. Cl.
CPC ........... *H04W 72/048* (2013.01); *H04W 4/50* (2018.02); *H04W 72/087* (2013.01)

(58) Field of Classification Search
CPC ....... G06F 21/10; H04W 28/24; H04W 24/02; H04W 16/02; H04W 24/10
USPC ........................................................... 380/59
See application file for complete search history.

(56) References Cited

U.S. PATENT DOCUMENTS

| | | | | |
|---|---|---|---|---|
| 5,910,987 | A * | 6/1999 | Ginter | G06F 21/10 348/E5.006 |
| 5,982,891 | A * | 11/1999 | Ginter | G06F 21/10 348/E5.006 |
| 6,363,488 | B1 * | 3/2002 | Ginter | G06F 21/10 348/E5.006 |
| 8,543,842 | B2 * | 9/2013 | Ginter | H04L 9/3247 713/194 |
| 8,572,411 | B2 * | 10/2013 | Ginter | G06Q 20/1235 713/194 |
| 9,111,288 | B2 * | 8/2015 | Paul | G06Q 30/02 |
| 10,356,663 | B2 * | 7/2019 | Shimojou | H04W 24/02 |
| 2002/0112171 | A1 * | 8/2002 | Ginter | G06Q 20/085 713/185 |

(Continued)

FOREIGN PATENT DOCUMENTS

WO    2016/150623 A1    9/2016

OTHER PUBLICATIONS

International Search Report and Written Opinion received for corresponding Patent Cooperation Treaty Application No. dated Mar. 5, 2018, 27 pages.

(Continued)

*Primary Examiner* — William D Cumming
(74) *Attorney, Agent, or Firm* — Nokia Technologies Oy

(57) ABSTRACT

It is provided a method, comprising requesting a resource for a service from a network, wherein the request includes a requirement indication indicating a requirement to the resource to be fulfilled for the service.

18 Claims, 5 Drawing Sheets

(56) References Cited

U.S. PATENT DOCUMENTS

| | | | |
|---|---|---|---|
| 2003/0088784 A1* | 5/2003 | Ginter | G06Q 30/06 713/189 |
| 2003/0105721 A1* | 6/2003 | Ginter | G06Q 50/188 705/54 |
| 2004/0054630 A1* | 3/2004 | Ginter | H04N 21/443 705/53 |
| 2004/0103305 A1* | 5/2004 | Ginter | G06F 21/10 726/27 |
| 2004/0133793 A1* | 7/2004 | Ginter | H04N 21/235 713/193 |
| 2006/0224903 A1* | 10/2006 | Ginter | G06Q 20/24 713/193 |
| 2010/0228996 A1* | 9/2010 | Ginter | H04N 21/42646 713/189 |
| 2016/0353367 A1 | 12/2016 | Vrzic et al. | |
| 2017/0206115 A1* | 7/2017 | Shimojou | H04L 41/5054 |
| 2019/0014504 A1* | 1/2019 | Shimojou | H04W 28/24 |
| 2019/0253907 A1* | 8/2019 | Yao | H04W 16/02 |
| 2019/0253912 A1* | 8/2019 | Yao | H04W 24/10 |
| 2019/0281486 A1* | 9/2019 | Yao | H04W 24/10 |
| 2019/0364450 A1* | 11/2019 | Yao | G06F 9/4881 |
| 2020/0187182 A1* | 6/2020 | Shimojou | H04L 41/5054 |

OTHER PUBLICATIONS

"3rd Generation Partnership Project; Technical Specification Group Services and System Aspects; Study on Architecture for Next Generation System (Release 14)", 3GPP TR 23.799 V14.0.0, Dec. 2016, pp. 1-522.

Malarvizhi et al.,"A Broker-Based Approach to Resource Discovery and Selection in Grid Environments", International Conference on Computer and Electrical Engineering, Dec. 20-22, 2008, pp. 322-326.

"TP for Network Slice Election and CN Entity Selection", 3GPP TSG-RAN WG3 Meeting #93, R3-161979, Agenda : 10.2.2, Nokia, Aug. 22-26, 2016, 6 pages.

"Proposed Network Slicing Update to 23.501 Clause 5.13", SA WG2 Meeting #118bis, S2-170169, Agenda : 6.5.1, ZTE, Jan. 16-20, 2017, pp. 1-4.

Natarajan et al., "An Analysis of Lightweight Virtualization Technologies for NFV", Internet Engineering Task Force (IETF), Internet Draft, Jul. 8, 2016, pp. 1-16.

Office action received for corresponding European Patent Application No. 17706419.3, dated Sep. 8, 2020, 9 pages.

* cited by examiner

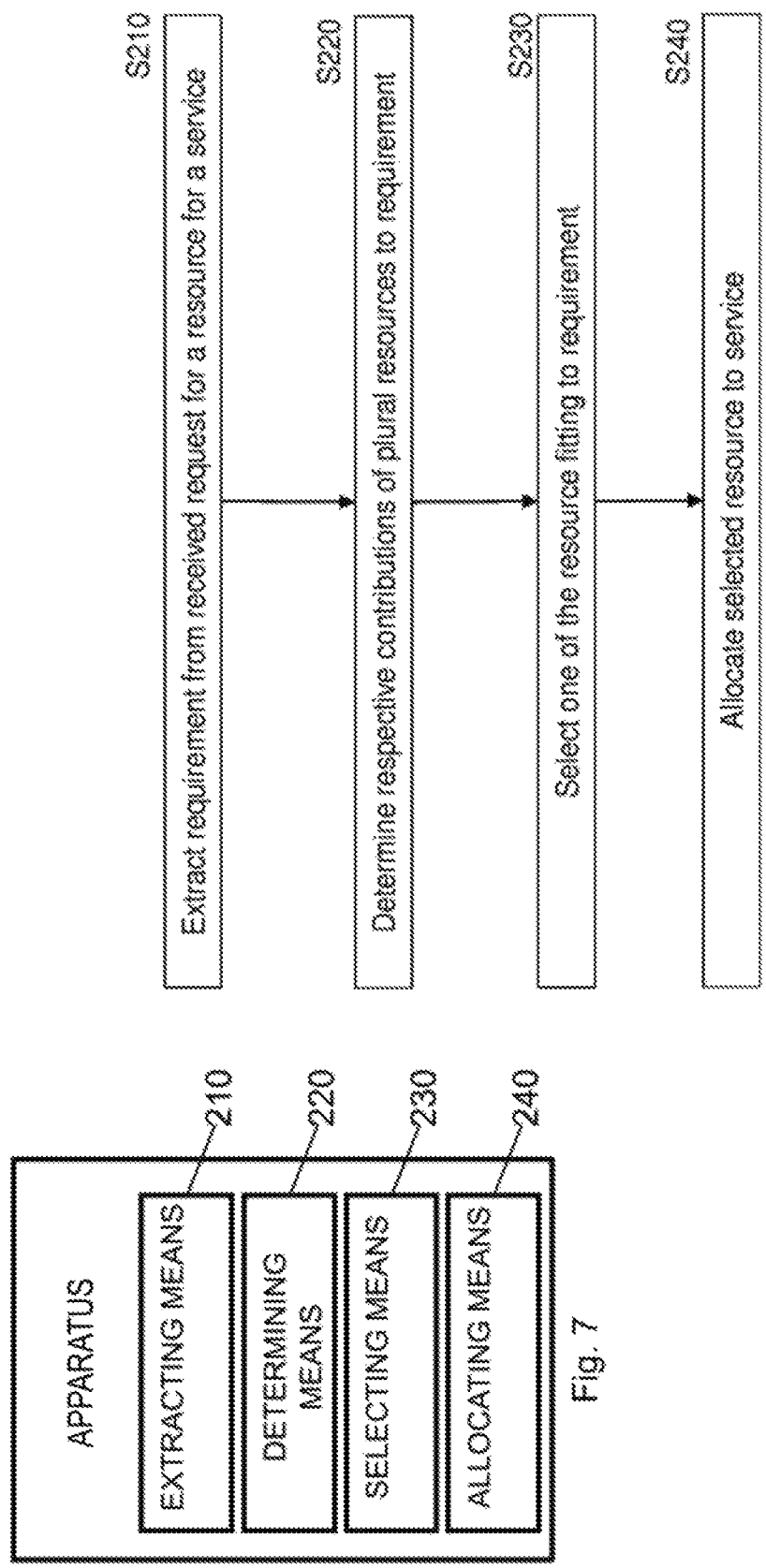

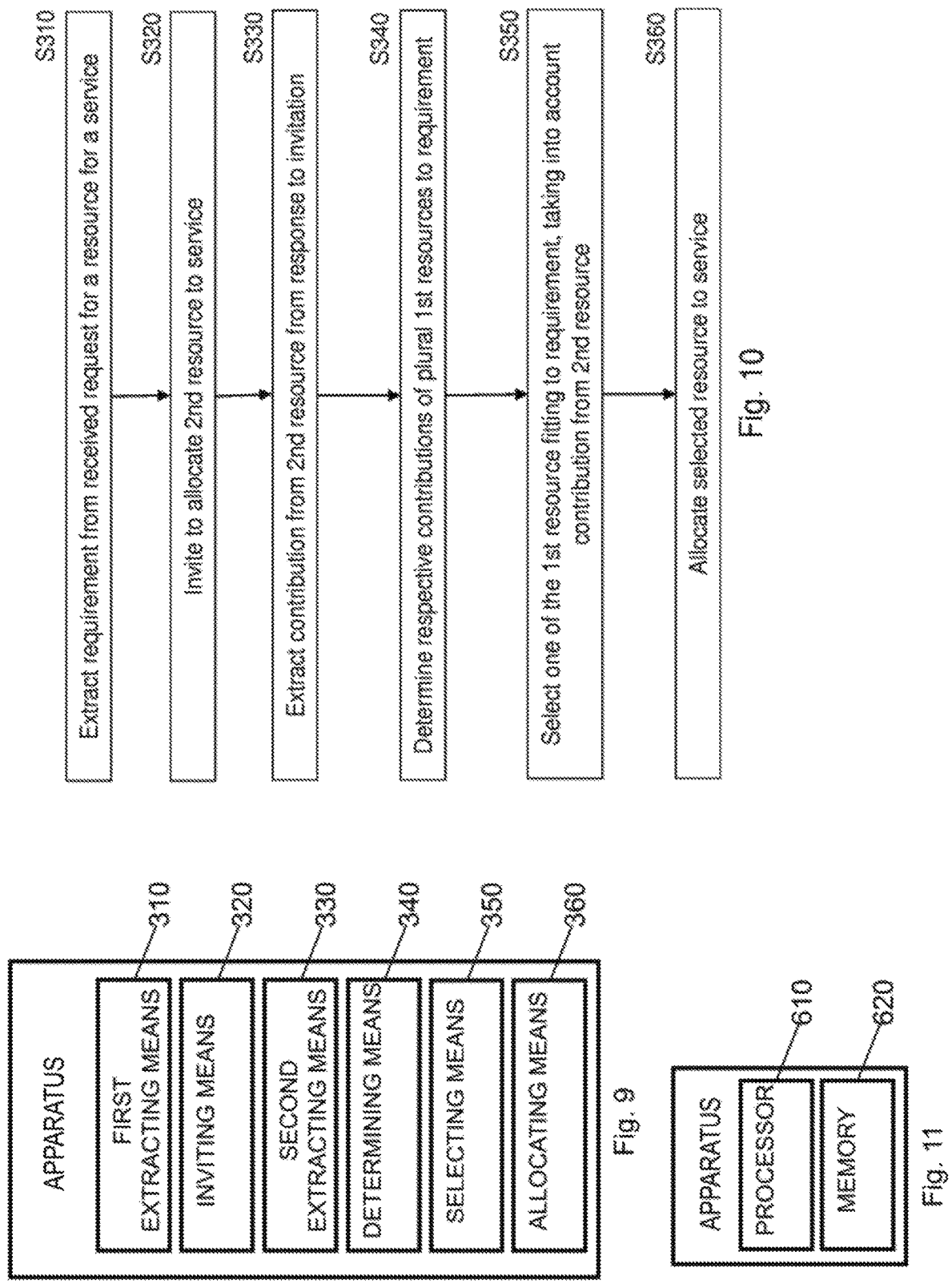

SUSTAINABLE SERVICE SELECTION

RELATED APPLICATION

This application was originally filed as Patent Cooperation Treaty Application No. PCT/EP2017/052311 filed Feb. 3, 2017.

FIELD OF THE INVENTION

The present invention relates to an apparatus, a method, and a computer program product related to service selection. More particularly, the present invention relates to an apparatus, a method, and a computer program product of service selection based on requirements.

ABBREVIATIONS

3GPP Third Generation Partnership Project
4G 4th Generation
5G 5th Generation
AF Application Function
AN Access Node
APN Access Point Name
BGW Border Gateway
BS Base Station
CDMA Code Division Multiple Access
CP Control Plane
CriC Critical Communications
CSCF Call Session Control Function (IMS)
CUPS Control and User Plane Separation
DGQ dynamic generic QoS/SLA
DL Downlink
DN Data Network
e2e end-to-end
EDGE Enhanced Datarate for GSM Evolution
eMBB Enhanced Mobile Broadband
eNB evolved NodeB
ES ETSI Specification
ETSI European Telecommunications Standards Institute
FMC Fixed Mobile Convergence
FTEID Fully qualified TEID
GBR Guaranteed Bit Rate
GGSN Gateway GPRS Support Node
GPRS General Packet Radio System
GTP GPRS Tunnel Protocol
HPLMN Home PLMN
IBCF Interconnection Border Control Function
ID Identifier
IMS IP Multimedia Subsystem
KPI Key Performance Indicator
LTE Long Term Evolution
LTE-A LTE-Advanced
MME Mobility Management Entity
mMTC massive MTC
MTC Machine-type Communication
NFV Network Function Virtualization
PGW Packet Gateway
PLMN Public Land Mobile Network
ProcD Processing Delay
PropD Propagation Delay
QoS Quality of Service
RAN Radio Access Network
RTT Round Trip Time
SGSN Serving GPRS Support Node
SGW Serving Gateway
SLA Service Level Agreement
TEID Tunnel Endpoint Identifier
TranD Transmission Delay
TrGW Transition Gateway
TR Technical Report
TTI Transmission Time interval
UE User Equipment
UP User Plane
UTRAN UMTS Terrestrial Radio Access Network
VPLMN Visited PLMN
WiFi Wireless Fidelity

BACKGROUND OF THE INVENTION

According to the prior art, the slice selection (i.e. which slice performs which service or part of a service) is performed based on an Application ID and Service Descriptor. The following is an extract of 3GPP TR 23.799:
Extract begin
In order to perform network selection, the selection principle should enable selection of the appropriate function to deliver a certain service even within a class of functions designed for a certain use case.
In summary, selection criteria should enable selection of right network slice for a certain application and also the right functional components within the network slice for a certain service requested by the UE at any time. The figure below shows that the application running in the UE can provide a multi-dimensional descriptor. The multi-dimensional descriptor may contain at least the following:
Application ID.
Service Descriptor (e.g. eMBB service, CriC, mMTC).
The network can use the multi-dimensional descriptor along with other information (e.g. subscription) available in the network to choose the appropriate network slice and network functions. This is referred to as the multi-dimensional selection mechanism.
Following are the possible options for network slice and function selection:
1 Two-step selection mechanism: Along with information (e.g. subscription) available in the network, selection function in the RAN uses the application ID (part of the multi-dimensional descriptor) to select the appropriate core network slice and selection function within the core network uses the service descriptor (part of the multi-dimensional descriptor) selects the appropriate network functions within the network slice.
2 One-step selection mechanism: Along with information (e.g. subscription) available in the network, selection function within the RAN or the selection function in the core network uses the application ID and Service Descriptor (multi-dimensional descriptor) to select the appropriate network slice, network functions and (re-) directs the UE accordingly.
Extract End
According to this extract, 3GPP intends to base the slice selection on the two parameters called application ID and Service Descriptor such as mMTC and CrIC etc.
That means that the UE is expected to explicitly setup these Application ID and Service Descriptor and the network is expected to evaluate those.
This leads to the problem that the network (RAN or Core) needs to evaluate and recognize each and every new Application ID and new Service descriptor in order to be able to calculate/select/determine the corresponding slice for each combination of Application ID and Service descriptor. Thus, every new Application ID and/or Service descriptor will impact the network (RAN and/or CORE) because each new Application ID and/or Service descriptor has to be recognized. In roaming cases, not only the HPLMN but also the VPLMN needs to understand each combination of Application ID and Service descriptor to select an appropriate type of slice to support the requested service. In order to solve this issue, a standardized set of dedicated Application IDs and dedicated Service descriptors may be agreed to correlate/map any combination to a type of slice.

SUMMARY OF THE INVENTION

It is an object of the present invention to improve the prior art.

According to a first aspect of the invention, there is provided an apparatus, comprising at least one processor, at least one memory including computer program code, and the at least one processor, with the at least one memory and the computer program code, being arranged to cause the apparatus to at least perform at least requesting a resource for a service from a network, wherein the request includes a requirement indication indicating a requirement to the resource to be fulfilled for the service.

According to a second aspect of the invention, there is provided an apparatus, comprising at least one processor, at least one memory including computer program code, and the at least one processor, with the at least one memory and the computer program code, being arranged to cause the apparatus to at least perform at least extracting a requirement from a received request for a first resource for a service, wherein the request comprises a requirement indication, and the requirement indication indicates the requirement to be fulfilled for the service; determining a contribution of the first resource to the requirement for a case that a first part of the service is executed on the first resource; asking for a second resource for executing a second part of the service, wherein the asking includes a contribution indication, the contribution indication indicates an allowable contribution to the requirement, and the allowable contribution is based on the requirement and the contribution of the first resource.

The at least one memory and the computer program code may be arranged to cause the apparatus to further perform determining, for each of plural first resources for the service, a respective contribution of the respective first resource to the requirement for a case that the first part of the service is executed on the respective first resource; wherein the asking for the second resource includes one or more contribution indicator pairs each comprising an identification of a respective first resource of the plural first resources and a respective contribution indication, and each of the contribution indications is based on the requirement and the contribution of the respective first resource.

The at least one memory and the computer program code may be arranged to cause the apparatus to further perform checking, for each of the plural first resources, based on the respective contribution, if the requirement for the service can be fulfilled by the respective first resource; inhibiting, for each of the plural first resources, that the asking for the second resource includes the contribution indicator pair comprising the identification of the respective first resource if the requirement for the service cannot be fulfilled by the respective first resource.

The at least one memory and the computer program code may be arranged to cause the apparatus to further perform monitoring if a received response to the asking for the second resource comprises the identification of a selected one of the first resources; allocating the selected one of the first resources to the service if the response comprises the identification of the selected one of the first resources.

In the apparatus, at least one of the allowable contribution may be indicated in the contribution indication by the requirement and the contribution of the first resource; and the at least one memory and the computer program code, may be arranged to cause the apparatus to further perform calculating the allowable contribution based on the requirement and the contribution of the first resource, and the contribution indication may comprise the calculated allowable contribution.

The at least one memory and the computer program code may be arranged to cause the apparatus to further perform checking if the contribution of the first resource allows fulfilling the requirement; allocating the first resource to the service if the contribution of the first resource allows fulfilling the requirement.

The at least one memory and the computer program code may be arranged to cause the apparatus to further perform providing an outgoing impossibility indication in response to the request for the first resource if the contribution of the first resource does not allow fulfilling the requirement.

The at least one memory and the computer program code may be arranged to cause the apparatus to further perform monitoring if, in response to the asking for the second resource, an incoming impossibility indication is received, wherein the incoming impossibility indication indicates that the second resource exceeds the allowable contribution; determining a contribution of a third resource to the requirement for a case that the second part of the service is executed on the third resource; checking if the contribution of the third resource exceeds the allowable contribution; allocating the third resource to the service if the contribution of the third resource does not exceed the allowable contribution and the incoming impossibility indication is received.

According to a third aspect of the invention, there is provided an apparatus, comprising at least one processor, at least one memory including computer program code, and the at least one processor, with the at least one memory and the computer program code, being arranged to cause the apparatus to at least perform at least extracting a requirement from a received request for a first resource for a service, wherein the request comprises a requirement indication, and the requirement indication indicates the requirement to be fulfilled for the service; determining, for each of plural first resources, a respective first contribution to the requirement for a case that at least a first part of the service is executed on the respective first resource; selecting one of the plural first resources such that a discrepancy between the requirement and the respective first contribution is within a predetermined limit; allocating the selected first resource to the service.

The requirement indication may include an overall requirement indication and a contribution indication, the overall requirement indication may indicate an overall requirement for the service, and the contribution indication may indicate a second contribution to the overall requirement caused by a second resource if the second resource executes a second part of the service; and the at least one memory and the computer program code may be arranged to cause the apparatus to further perform extracting the overall requirement from the requirement indication; extracting the second contribution from the requirement indication; and the one of the plural first resources is selected such that a discrepancy between the overall requirement and a total of the second contribution and the respective first contribution is within the predetermined limit.

The requirement may include the overall requirement for the service and plural second contributor indicators, each of the second contributor indicators may comprise an identification of a respective second resource and a respective second contribution indication indicating a respective second contribution to the overall requirement caused by the respective second resource if the second resource executes the second part of the service; and the at least one memory and the computer program code may be arranged to cause the apparatus to further perform extracting, for each of the contribution indicator pairs, the respective identification and the respective second contribution; determining a respective total contribution for one or more contribution pairs of a respective one of the first contributions and a respective one of the second contributions; selecting one of the contributing pairs such that a discrepancy between the overall contribution and the respective total contribution is within the predetermined limit; determining a selected first resource of the first resources, wherein the selected first resource contributes the respective first contribution of the selected contributing pair; determining the identification of a selected second resource, wherein, according to the respective second contributor indicator, the selected second resource contributes the respective second contribution of the selected contributing pair; allocating the selected first resource to the service; informing a device on the selected first resource and the identification of the selected second resource, wherein the request is received from the device.

According to a fourth aspect of the invention, there is provided an apparatus, comprising at least one processor, at least one memory including computer program code, and the at least one processor, with the at least one memory and the computer program code, being arranged to cause the apparatus to at least perform at least extracting a requirement from a received request for a first resource for a service, wherein the request comprises a requirement indication, and the requirement indication indicates the requirement to be fulfilled for the service; inviting a selecting device to allocate a second resource to the service for executing a second part of the service, wherein the invitation comprises the requirement indication; extracting a second contribution indication from a response to the invitation, wherein the second contribution indication indicates a contribution of the second resource if the second part of the service is executed on the second resource; determining, for each of plural first resources, a respective first contribution to the requirement for a case that at least a first part of the service is executed on the respective first resource; selecting one of the plural first resources such that a discrepancy between the requirement and a total of the respective first contribution and the second contribution is within a predetermined limit; allocating the selected first resource to the service.

In each of the apparatuses according to any of the third and fourth aspects, the at least one memory and the computer program code may be arranged to cause the apparatus to further perform providing an identification of the selected first resource and the first contribution of the selected first resource in response to the received request.

In each of the apparatuses according to any of the third and fourth aspects, the at least one memory and the computer program code may be arranged to cause the apparatus to further perform adding an information on the first contribution of the selected first resource to a charging record related to the processing of the service.

In each of the apparatuses according to any of the first to fourth aspects, the requirement may be at least one of a latency, a jitter, a bandwidth, a packet loss rate, an error rate, a resource type, a priority, a reliability, and a combined parameter based on at least two of the latency, the jitter, the bandwidth, the packet loss rate, the error rate, the resource type, the priority, and the reliability.

According to a fifth aspect of the invention, there is provided a method, comprising requesting a resource for a service from a network, wherein the request includes a requirement indication indicating a requirement to the resource to be fulfilled for the service.

According to a sixth aspect of the invention, there is provided a method, extracting a requirement from a received request for a first resource for a service, wherein the request comprises a requirement indication, and the requirement indication indicates the requirement to be fulfilled for the service; determining a contribution of the first resource to the requirement for a case that a first part of the service is executed on the first resource; asking for a second resource for executing a second part of the service, wherein the asking includes a contribution indication, the contribution indication indicates an allowable contribution to the requirement, and the allowable contribution is based on the requirement and the contribution of the first resource.

The method may further comprise determining, for each of plural first resources for the service, a respective contribution of the respective first resource to the requirement for a case that the first part of the service is executed on the respective first resource; wherein the asking for the second resource may include one or more contribution indicator pairs each comprising an identification of a respective first resource of the plural first resources and a respective contribution indication, and each of the contribution indications may be based on the requirement and the contribution of the respective first resource.

The method may further comprise checking, for each of the plural first resources, based on the respective contribution, if the requirement for the service can be fulfilled by the respective first resource; inhibiting, for each of the plural first resources, that the asking for the second resource includes the contribution indicator pair comprising the identification of the respective first resource if the requirement for the service cannot be fulfilled by the respective first resource.

The method may further comprise monitoring if a received response to the asking for the second resource comprises the identification of a selected one of the first resources; allocating the selected one of the first resources to the service if the response comprises the identification of the selected one of the first resources.

The allowable contribution may be indicated in the contribution indication by the requirement and the contribution of the first resource; and the method may further comprise calculating the allowable contribution based on the requirement and the contribution of the first resource, and the contribution indication may comprise the calculated allowable contribution.

The method may further comprise checking if the contribution of the first resource allows fulfilling the requirement; allocating the first resource to the service if the contribution of the first resource allows fulfilling the requirement.

The method may further comprise providing an outgoing impossibility indication in response to the request for the first resource if the contribution of the first resource does not allow fulfilling the requirement.

The method may further comprise monitoring if, in response to the asking for the second resource, an incoming impossibility indication is received, wherein the incoming impossibility indication indicates that the second resource exceeds the allowable contribution; determining a contribution of a third resource to the requirement for a case that the second part of the service is executed on the third resource; checking if the contribution of the third resource exceeds the allowable contribution; allocating the third resource to the service if the contribution of the third resource does not exceed the allowable contribution and the incoming impossibility indication is received.

According to the seventh aspect of the invention, there is provided a method, comprising extracting a requirement from a received request for a first resource for a service, wherein the request comprises a requirement indication, and the requirement indication indicates the requirement to be fulfilled for the service; determining, for each of plural first resources, a respective first contribution to the requirement for a case that at least a first part of the service is executed on the respective first resource; selecting one of the plural first resources such that a discrepancy between the requirement and the respective first contribution is within a predetermined limit; allocating the selected first resource to the service.

The requirement indication may include an overall requirement indication and a contribution indication, the overall requirement indication may indicate an overall requirement for the service, and the contribution indication may indicate a second contribution to the overall requirement caused by a second resource if the second resource executes a second part of the service; and the method may further comprise extracting the overall requirement from the requirement indication; extracting the second contribution from the requirement indication; and the one of the plural first resources may be selected such that a discrepancy between the overall requirement and a total of the second contribution and the respective first contribution is within the predetermined limit.

The requirement may include the overall requirement for the service and plural second contributor indicators, each of the second contributor indicators may comprise an identification of a respective second resource and a respective second contribution indication indicating a respective second contribution to the overall requirement caused by the respective second resource if the second resource executes the second part of the service; and the method may further comprise extracting, for each of the contribution indicator pairs, the respective identification and the respective second contribution; determining a respective total contribution for one or more contribution pairs of a respective one of the first contributions and a respective one of the second contributions; selecting one of the contributing pairs such that a discrepancy between the overall contribution and the respective total contribution is within the predetermined limit; determining a selected first resource of the first resources, wherein the selected first resource contributes the respective first contribution of the selected contributing pair; determining the identification of a selected second resource, wherein, according to the respective second contributor indicator, the selected second resource contributes the respective second contribution of the selected contributing pair; allocating the selected first resource to the service; informing a device on the selected first resource and the identification of the selected second resource, wherein the request is received from the device.

According to an eighth aspect of the invention, there is provided a method, comprising extracting a requirement from a received request for a first resource for a service, wherein the request comprises a requirement indication, and the requirement indication indicates the requirement to be fulfilled for the service; inviting a selecting device to allocate a second resource to the service for executing a second part of the service, wherein the invitation comprises the requirement indication; extracting a second contribution indication from a response to the invitation, wherein the second contribution indication indicates a contribution of the second resource if the second part of the service is executed on the second resource; determining, for each of plural first resources, a respective first contribution to the requirement for a case that at least a first part of the service is executed on the respective first resource; selecting one of the plural first resources such that a discrepancy between the requirement and a total of the respective first contribution and the second contribution is within a predetermined limit; allocating the selected first resource to the service.

Each of the methods according to any of the seventh and eighth aspects may further comprise providing an identification of the selected first resource and the first contribution of the selected first resource in response to the received request.

Each of the methods according to any of the seventh and eighth aspects may further comprise adding an information on the first contribution of the selected first resource to a charging record related to the processing of the service.

In each of the methods according to any of the fifth to eighth aspects, the requirement may be at least one of a latency, a jitter, a bandwidth, a packet loss rate, an error rate, a resource type, a priority, a reliability, and a combined parameter based on at least two of the latency, the jitter, the bandwidth, the packet loss rate, the error rate, the resource type, the priority, and the reliability.

Each of the methods according to any of the fifth to eighth aspects may be a method of service selection.

According to a ninth aspect of the invention, there is provided a computer program product comprising a set of instructions which, when executed on an apparatus, is configured to cause the apparatus to carry out the method according to any of the fifth to eighth aspects. The computer program product may be embodied as a computer readable medium or directly loadable into a computer.

According to some embodiments of the invention, at least one of the following advantages may be achieved:
The awfully static present approach on assigning resources to a service is overcome;
Resource utilization may be optimized, even in case of roaming.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

FIG. 7 shows an apparatus according to an embodiment of the invention;

FIG. 8 shows a method according to an embodiment of the invention;

FIG. 9 shows an apparatus according to an embodiment of the invention;

FIG. 10 shows a method according to an embodiment of the invention; and

FIG. 11 shows an apparatus according to an embodiment of the invention.

DETAILED DESCRIPTION OF CERTAIN EMBODIMENTS

Figure 1:
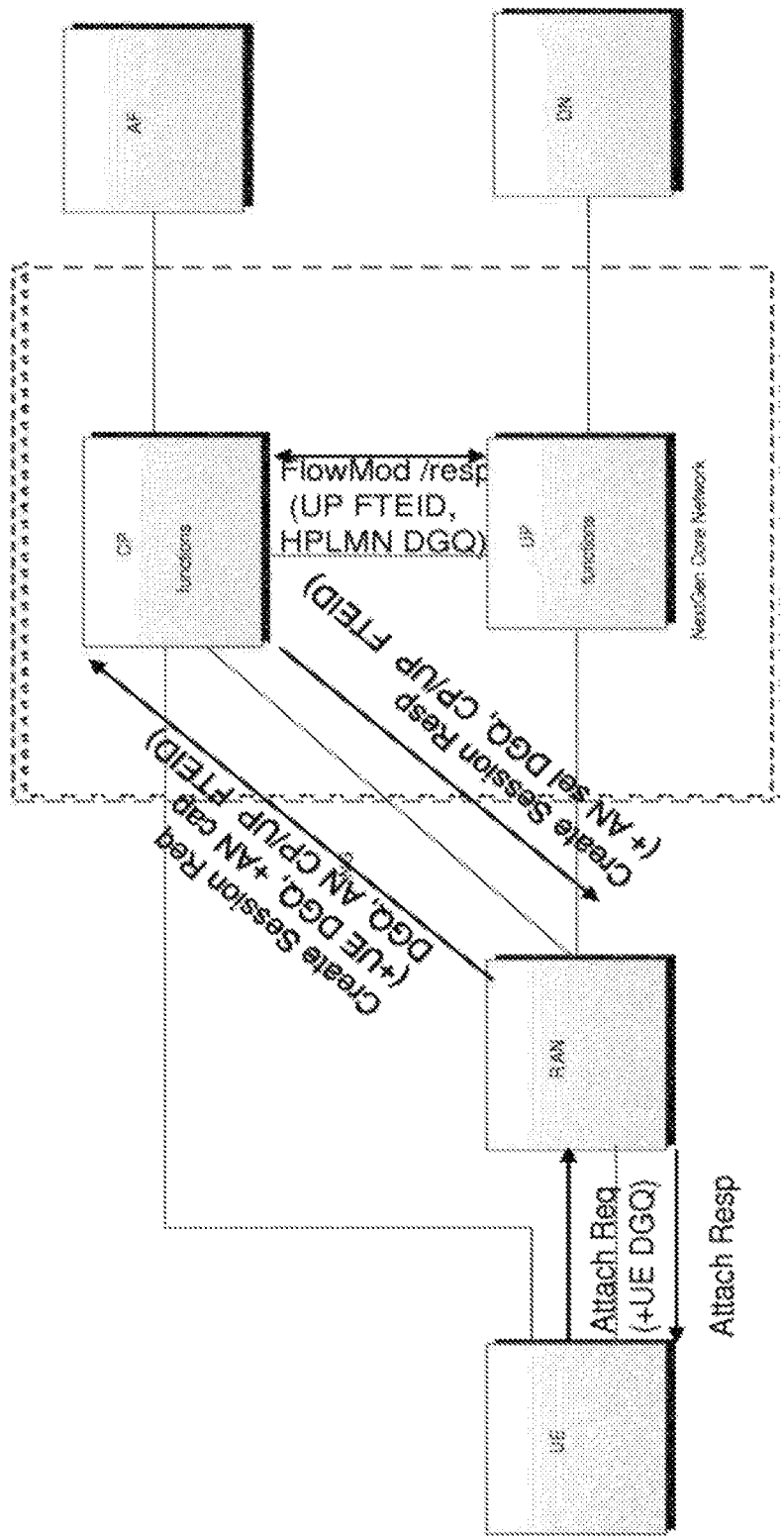
FIG. 1 shows a message flow in the non-roaming case according to some embodiments of the invention.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

The prior art approach for network selection is not generic, awfully specific, and not sustainable. There are doubts that one should go for specifying an application ID which should be set up by the UE.

Furthermore it was recognized that especially the delay and the jitter is not appropriately considered in the selection process of the corresponding network functions within 3GPP until now. For instance, according to [1]: https://tools.ietf.org/html/draft-natarajan-nfvrg-containers-for-nfv-03, the latency of different kinds of virtualization will lead to totally different delays (see e.g. Table 1 below, according to which the delay varies from 4 ms to 34 ms):

TABLE 1

RTT dependence on technology type according to chapter 4.4. RTT of [1].

| Technology Type | Time (msecs) |
| --- | --- |
| standardvm.xen | 34 |
| standardvm.kvm | 18 |
| Container | 4 |
| tinyx.kvm | 19 |
| tinyx.xen | 15 |
| unikernel.osv.kvm | 9 |
| unikernels.minios.xen | 5 |

In the low and ultra-low latency use case the contribution of each node cannot be neglected in order to find and to select the best nodes. Therefore, preferably, the roaming partners shall at least share their knowledge on the latencies and jitters to be able to meet the latency/jitter requirements at all.

Conventionally, the selection process is not able to meet a 5 ms delay requirement, if the selection procedure selects a node which contributes 34 ms to the delay. Such a node may be selected because the conventional selection process simply does not know about the individual delay contribution of each candidate node.

If the UE or the application in the UE (e.g. a smartphone) can have knowledge of some application ID, it also could have knowledge of the QoS/SLA parameters for the application. Therefore, according to some embodiments of the invention, the UE provides information of QoS/SLA parameters to the network in the first place, instead of creating for every (mini-)application a new application ID.

Then, even in case of roaming, it is up to the network(s) to allocate/select the "slice" fitting best the QoS/SLA requirements. That is, the network(s) have to map the service requirements (QoS/SLA) to their own deployment of their "slices". Thus, each network is able to set up its slices according to own needs without being restricted to some kind of "standardized slices/networks" to ensure interoperability between slices of different operators.

More generally, a slice is a resource to be allocated to perform the service. The invention does not depend on virtualization (i.e. on implementing a function on a slice) and any resource to perform the service may be selected based on the above principle. Another example of a resource is a network node or a network function.

At the end the end users want to have interoperability of services. They do not really care how one operator arranges its slices and the end users are not interested in knowing how the different operators ensure the interoperability of their different types (flavours) of slices. The latter does not have any value add to the end user, the operator and the vendors.

Alternatively to the approach described in 3GPP TR 23.799, according to some embodiments of the invention, the UE provides a QoS/SLA parameter describing a corresponding requirement if the UE requests a resource for the service. The QoS/SLA parameter is named "dynamic generic QoS/SLA parameter" (DGQ) hereinafter because it is considered to be more dynamic and generic than the Application ID according to 3GPP TR 23.799. It is a kind of a requirement indication.

For example, the UE may send DGQ at attachment to the RAN and Core for each application wishing/needing to have connectivity. In particular the application developers knowing their requirements best, shall populate/setup the content required for the application. That is, DGQ is predefined for each application. In some embodiments, plural DGQs may be predefined for one application which may be selected by the application depending on some condition.

For instance, the application shall submit its requirement (s) with regard to at least one of Minimum latency/maximum latency
Maximum jitter/minimum jitter
Bandwidth
Packet error rate
Packet loss rate
Resource type (GBR or Non-GBR)
Priority
Reliability
Vendor specific extensions This list is not exhaustive. For example, other requirements may be based on a combination of two or more of these parameters.

For instance, if the application within the UE requires the bandwidth of 20 Mbps this number shall be signalled in the Attach request (Attach is just an example and is the same name as currently used in the LTE environment, but may be different in other technologies such as 5G). Additionally, the UE may indicate for instance the delay requirements of the service, e.g. as 6 ms. Both requirements may be signalled in respective information elements of the new parameter UE DGQ.

If a certain parameter is not set up by the UE (i.e., if a certain QoS/SLA requirement is not indicated), the UE and the network may act and behave as in the previous versions of the UE specifications.

According to some embodiments of the invention, the network evaluates this new information element in order to select and allocate a resource fulfilling the requirements of the service request.

That is, the UE sends this new parameter to the RAN (e.g. eNB or WiFi AN) in the attach request. In some embodiments of the invention, the RAN sets up another new parameter indicating its available resources and capability (i.e., its contribution to the QoS/SLA requirement received from the UE) in a similar way when forwarding the attach request/Create Session request to the core network (again, attach request and Create Session request are just examples to request resources, which are already known from the LTE environment), in case of the non-roaming case and potentially also in the roaming case. This new parameter with the capability (contribution) of the RAN may be included always in the request for a resource, in order to indicate that the procedure according to some embodiments of the invention is supported.

That is, according to some embodiments of the invention, the RAN, when requesting a resource for the service, forwards two DGQ parameters: UE DQG received from UE and indicating the overall requirement for the service, and another parameter (named e.g. RAN DGQ) indicating the contribution of RAN to the overall requirement. In some embodiments, instead of or in addition to the two DGQ parameters, RAN forwards another DQG parameter which indicates the contribution which the core is allowed to add. E.g., if the acceptable overall delay indicated by the UE is 100 ms, and RAN contributes a delay of 30 ms, core may add a delay of 70 ms, which may be indicated in a corresponding parameter in the request for a resource.

By signalling the DGQ parameter(s), the resources may be allocated in a (more) optimal way compared to the prior art, wherein only best guesses may be performed for the resource selection.

If the new DGQ parameter(s) are signalled then there are in general at least two possibilities how to proceed:
  the originator of the request and the part of the network from which a further resource is requested allocate their resources independently from each other; or alternatively
  they allocate their resources in conjunction and in cooperation (/with negotiation).

Independent selection may lead to suboptimal allocation, whereas cooperative selection would lead to better resource utilisation and service offering to the user and less cost for the operators. On the other hand, cooperative selection requires negotiation which is not required for independent selection and may require disclosure of potentially critical information to the roaming partner operator.

As an example, within one network, the selection of different RAN slices and different Core Network slices may be performed either independently or cooperatively. Correspondingly, in the roaming case, the resources of VPLMN and HPLMN allocated to the service may be selected independently per network or cooperatively between the networks.

In the following, a cooperative selection in the roaming case according to some embodiments of the invention is outlined at greater detail:

In this scenario the VPLMN (either the RAN directly or the potentially separated CP of the core) shares the candidate CP and/or UP addresses with the HPLMN via the signalling in the Create Session request.

Preferably, in order to gain further synergy, the higher layer protocol between the RAN and the CP of the Core and between the CP of the VPLMN and the CP of the HPLMN shall be the same. This allows the RAN of e.g. a VPLMN to be directly connected to the CP of the HPLMN. However, the above requirement is not compulsory. E.g., the RAN of VPLMN may communicate with CP of HPLMN via CP of VPLMN.

After analysing the DGQ of the UE, for instance the VPLMN may offer/signal a list of addresses and/or location for at least one of the CP and the UP of the candidate resources of the VPLMN in the DGQ to the HPLMN. The resources of these addresses would match and/or at least would not violate any of the requirements of the UE. If the VPLMN would not be able to meet the requirements, the VPLMN may reject the request of the UE, or VPLMN may inform the UE of the impossibility asking to relax the requirements.

On receipt of both the UE DGQ and the DGQ of the VPLMN, the HPLMN evaluates the UE DGQ and the DGQ of the VPLMN and compares the UE requirements with the "consumed" and/or suggested contributions of the VPLMN in order to select the resource within the HPLMN such that the UE requirement are met. In addition, HPLMN may take into account business needs or other constraints in the selection.

An example requirement is the (user plane) latency requirement of the UE. For instance, assumed the UE requires a maximum latency of a) 11 ms or b) 4 ms then depending on the indication of the VPLMN that in case a) already 6 ms and in a case b) already 2 ms are consumed, the HPLMN selects its resources such that in case of a) for instance 5 ms are spent and in case of b) only 2 ms are spent.

That means that in case of a) the resources may be up to 2.5*66 km=165 km away from the UE. (For this calculation, it is assumed that fibres are used, which have on average an optical distance of 3 times of the "sight" distance and a speed of 200000 km/s).

However, in case b) the HPLMN would need to select resources at a maximum physical distance of about 66 km away from the UE and the allocated resource of the VPLMN. In case the HPLMN has corresponding resources at such a location, the HPLMN is suggested to return the addresses of the corresponding own resources in the Create Session response and also committing one of the resources earlier offered by the VPLMN. On receipt of the reply at the VPLMN the negotiation is completed.

However there might be the case that the HPLMN does not have resources in said vicinity (e.g. as required in the case b)). In some embodiments of the invention, as some kind of last resort, the HPLMN delegates the selection of the resources to the VPLMN in order to be able to fulfil the service request of the UE even in this case. Therefore, the VPLMN offers its own resources in the vicinity also to the HPLMN for re-usage. In order to be able to delegate, it is suggested that the HPLMN indicates its inability with a new information element in the Create Session response (e.g. named impossibility indication), according to which resources are not allocated in the HPLMN, but are to be allocated at the VPLMN instead.

In general there are at least two ways how to estimate and calculate the latency and how the selection of the corresponding resources is performed:

1. The network nodes may collect or calculate the estimated latency and signal the corresponding accumulated latency values to the peer, or
2. the peers may exchange the associated location of the corresponding node(s) and calculate the delay between them based on the geographic distance and/or network topology. In order to enable this exchange of location information, a respective Global Cloud ID may be assigned to each of the cloud centers running the network slices.

The two approaches may be combined.

The jitter may be estimated or calculated similarly to the delay. However, resources for other KPIs such as bandwidth and packet loss can be selected by simply not selecting resources which violate the requirements. For instance if a packet loss rate of not less than 10-5 is required, then e.g. a resource with a rate of 10-4 shall not be considered when selecting the resources.

Figure 2:
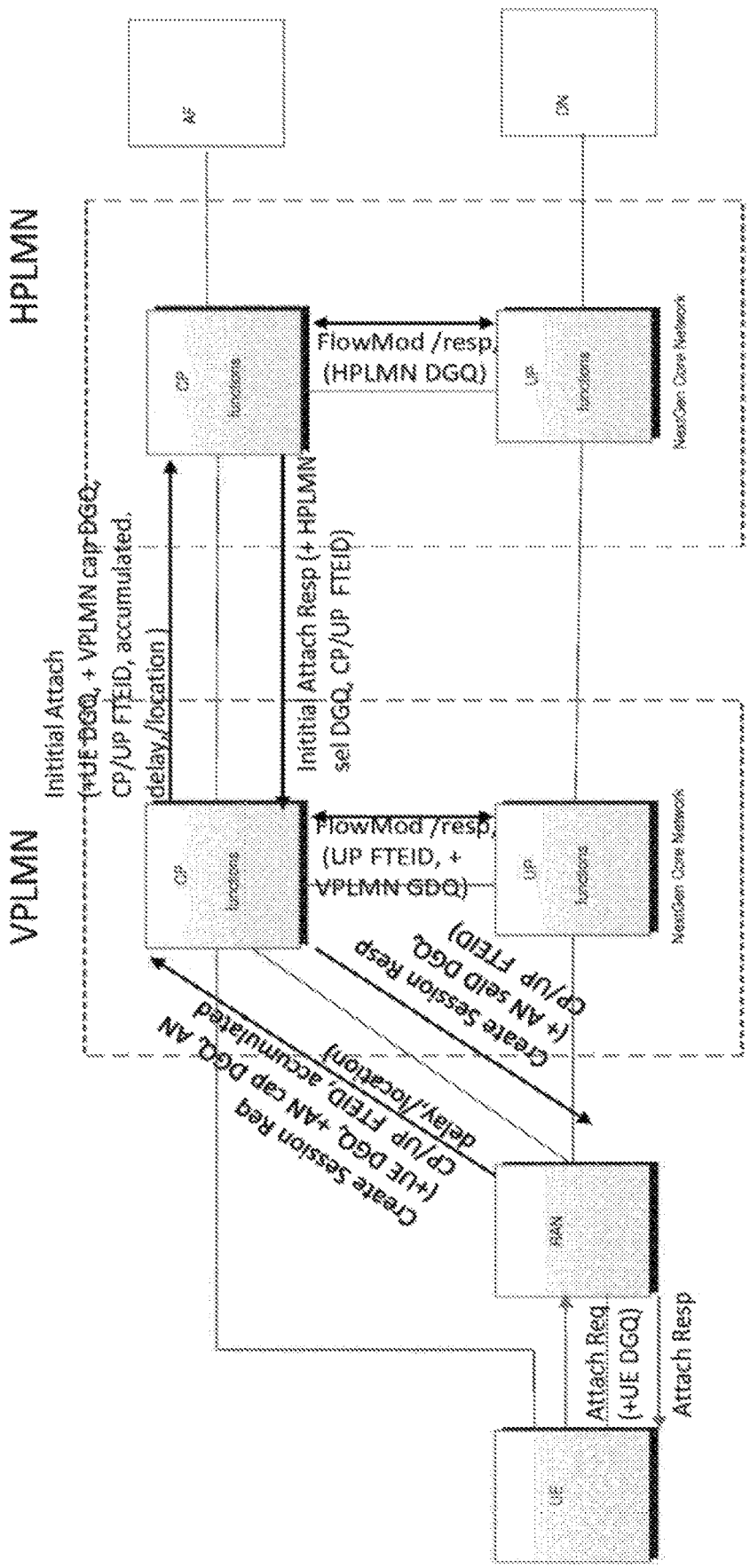
FIG. 2 shows a message flow in the roaming case according to some embodiments of the invention.

FIGS. 1 and 2 show example of sustainable service selections in the non-roaming (FIG. 1) and roaming case (FIG. 2) according to some embodiments of the invention. The FTEIDs typically denoting the GTP Tunnel ID including IP addresses are just examples for describing a termination point for the Control plane and for the User plane. It is to be understood just as a placeholder covering also any other endpoint between peers for exchanging control and user plane traffic.

As shown in FIG. 1, the UE provides to the RAN, along with the Attach request, a requirement indication such as UE DGQ. Due to the received Attach request, RAN issues a Create Session request to CP of core, which comprises UE DGQ, AN cap DQG (i.e. Access network capability DGQ), which indicates the capability/contribution of RAN to the requirement indicated by UE DGQ, and the AN CP/UP FTEID (Access network Control Plane/User Plan FTEID) carrying the ID of the potential candidate resources (e.g. IP or Ethernet address etc). Upon receipt of the Create Session Request, CP instructs UP by e.g. FlowMod (Flow Modification) as defined by OpenFLow, which comprises UP FTEID (User Plane Fully Qualified Tunnel Endpoint ID) and HPLMN DGQ to install the corresponding OpenFlow rules at the User plane. In addition, it informs the AN (e.g. RAN) about the CP (control plane) and UP FTEID of the selected resources in the HPLMN and RAN/AN and provides the AN sel DGQ (DGQ selected at the AN). E.g., in the cooperative mode the origin offers candidate resources and the terminating HPLMN side selects from the candidate list a particular (set of) resource(s) to meet the requirements as signalled/required by the UE. For that, the HPLMN informs the AN about the selected resources at the AN via the AN sel DGQ.

In the roaming case of FIG. 2, CP of VPLMN interacts with UP of VPLMN similarly as described for the non-roaming case, wherein HPLMN DGQ is replaced by VPLMN DGQ. In addition, CP of VPLMN sends Initial Request to CP of HPLMN, wherein the Initial Attach request comprises UE DGQ, CP and UP FTEID, and VPLMN cap DGQ, which indicates the contribution of VPLMN to the requirement indicated by UE DGQ. CP of HPLMN interacts with UP of HPLMN similarly as described in the non-roaming case. In response to the Initial Request from VPLMN, HPLMN CP provides the CP and UP FTEIDs and HPLMN sel DGQ (i.e. DGQ selected at HPLMN).

The selection of the resources may be cooperative or non-cooperative. In the non-cooperative scenario each of the two PLMNs select their respective resource independent from each other. In particular the VPLMN selects its resources and signals the addresses of the resources (e.g. CP plane and UP plane) towards the HPLMN. Consequently in this solution the HPLMN needs to adapt its selection of its resources to the input shared by the VPLMN in order to meet the overall requirement of the UE.

Although this might not lead to the optimal solution for the selection/placement of the corresponding resources, it does not require that the operators share the list of resources and to allow the selection of own resources by the foreign operator.

In general, both options (cooperative, non-cooperative) may be applied depending on the policies and business needs, so these two options may be dynamically negotiated between the two operators or pre-configured.

The non-roaming case is more or less a simplification of the roaming case because only one operator is involved, but this operator has the freedom and the duty to meet the overall requirement on its own as requested by the UE. However as the operator simultaneously owns the RAN and the core resources still the decision is to be taken how to split for instance the delay across the RAN and the core. For instance, the operator may allow to allocate more delay to the RAN and therefore less delay to the core, which means that core resources would be selected from clouds located nearer to the RAN. In the opposite case where less delay is allowed in the RAN the core resources may be selected from clouds/data centers located farther away from the RAN. In general the same procedures and parameters may be utilized as in the roaming case (compare e.g. FIGS. 1 and 2).

On receipt of parameter UE DGQ at the RAN, the RAN may evaluate the dynamic generic QoS/SLA parameter (DGQ), by querying a database about the available resources and utilization. For instance in one option the RAN consults an external or internal database for calculating and selecting the internal resources based on the content of the UE DGQ.

After or simultaneously with selecting the resources internal to the RAN the RAN consults an external or internal database for selecting the home/local/visited part of the core network. These network parts may select their resources based on the signalled information comprising the UE DGQ and the contribution from the RAN.

Alternatively, according to some embodiments of the invention, the Core[/HPLMN) may select/determine the overall budget, select the resources for its part of the network, calculate the remaining budget (contribution) with respect to the requirement, and signal it back to the RAN[/VPLMN] to configure the resources accordingly. The first case is applicable e.g. for the non-roaming case and for the VPLMN in the roaming case, and the second case is applicable to the roaming case.

It is noted that the above mentioned (KPI/QoS/SLA) attributes can be controlled independently from each other within some ranges without significantly influencing the other attributes. That means the bandwidth can be configured independent from the latency, even within the eNB/newRAN with RAN slicing. Consequently there is no need to predefine/preconfigure any slice type in beforehand. This creates flexibility and provides value add to the operator.

Therefore, according to some embodiments of the invention, the eNB/newRAN is internally configured depending on each of the attributes either by evaluating the above attributes itself or by being controlled by the core network (e.g. the MME of the LTE architecture, just as an example) to configure the resources such that the requirements of the UE are met. Preferably the RAN shall be configurable for each attribute within certain ranges being identified by a number like 1 up to 6, in order to avoid configurations with infinitesimal short steps from zero to the highest value. However, a floating presentation of the attributes is not excluded.

Table 2 gives an example for the capabilities of the newRAN and their classification. Similar parameters may be introduced for the interface between roaming partners in forward and backward direction.

TABLE 2

Example of classification of capabilities of newRAN

| Ordinal number classifying the ranges | Bandwidth e.g. downlink [mbit/s] | Delay | Jitter, packet delay variation (PDV) | Packet Error Loss Rate | Any other capability for proprietary usage/bilateral agreement |
|---|---|---|---|---|---|
| 1 | Up to [2] Mbps | Up to 0.5 ms | $10^{-7}$ s | $10^{-6}$ | |
| 2 | Up to [50] Mbps | 0.5 ms-5 ms | $10^{-6}$ s | $10^{-5}$ | |
| 3 | Up to [100] Mbps | 5 ms-10 ms | $10^{-5}$ s | $10^{-4}$ | |
| 4 | Up to [1000] Mbps | 10 ms-20 ms | $10^{-4}$ s | $10^{-3}$ | |
| 5 | | 20 ms-50 ms | $10^{-3}$ s | $10^{-2}$ | |
| 6 | To be completed as needed in the future | | | | |

The KPIs/attributes and values listed in the table above are just examples and are not exhaustive. Any other attributes may be classified correspondingly. The table shows how attributes may be addressed flexibly and independently.

Furthermore, the MME (or more general the CP in the Core) may maintain a similar table and configuration pattern for the remaining part of the budgets of each of the attributes/resources.

To help the selection, the newRAN/LTE (in general: the access network, or any other node involved in the service execution) may signal its own capability with regard to the required resources. For instance, if the RAN in question is capable of providing a packet loss of 10-6 then the RAN shall send the number 1 for packet loss rate.

That decouples the RAN from the Core configuration and the core may direct the RAN to pick any value from the categories available at the core to dynamically combine and compose the services as needed and economically feasible. There is no need to compose in beforehand any predefined and standardized slice across the operators, or in any RAN and no impact on the interface between RAN and Core if new applications requiring new service types needing a new slice in the network emerge!

If, for instance, the MME (control plane) (or any other instance either in the HPLMN or VPLMN) recognizes that the UE requests the delay x, the bandwidth y, then the MME may partition the budget across the eNB and the core network. Even in case of roaming, the service requirements sent by the UE may be signalled to the home PLMN and the home PLMN is able to allocate a fraction of the overall budget of each attribute to itself, and a remaining fraction to the VPLMN. And the VPLMN can allocate that fraction across its RAN and its core network dynamically as determined as a best split of the resources to meet the demand of the UE.

Alternatively, in some embodiments of the invention, in case of roaming the MME (or in general the Control plane of the VPLMN) may also signal respective capabilities for the resources in question, thus offering the HPLMN to select its part of the fraction for the related KPIs to be partitioned between the two operators.

In order to allocate the resources in an optimal way, it is beneficial that the HPLMN knowing the location of the UE, the QoS requirements of the UE and its own candidate resources with their capabilities and locations and the candidate resources of the VPLMN with their capabilities and locations determines/calculates the best combination of an own candidate resource and a candidate resource of the VPLMN in order to fulfil the requirements of the UE.

If for instance the HPLMN does not have any network resource available in the area of the UE for the requested service, the HPLMN may signal to the VPLMN that the VPLMN shall perform some kind of short cut to the application (this would be similar to the case of local breakout (not home routed)). In such a way the operator will take advantage of a flexible decision/selection depending on the circumstance in highly dynamic environment.

In some embodiments of the invention, the HPLMN may select its own resources and the VPLMN may select its own resources based on own policy and business needs. Even in the case of a cooperative selection, HPLMN and VPLMN may select the respective candidate resources based on own policy and business needs.

So the HPLMN may indicate to the VPLMN that there might be enough freedom for the VPLMN to select resources in accordance with its own needs. That is, in some of these embodiments, the HPLMN may inform the VPLMN on the remaining budget to fulfil the requirement of the UE, the VPLMN selects its resources based on the received indication on remaining budget and informs the HPLMN and the UE accordingly. This procedure has the advantage that the VPLMN need not to inform the HPLMN on the capabilities of some candidate resources, but it requires additional signalling from VPLMN to HPLMN in order to inform on the selected candidate resources. This additional signalling may be avoided if, according to some embodiments of the invention, the VPLMN, when requesting resources from the HPLMN, offers a list of candidate resources with their capabilities from which the HPLMN can select. Then HPLMN may inform VPLMN on the selected resource of HPLMN and on the selected candidate resource of VPLMN such that an additional signalling from VPLMN to HPLMN is not needed. In some embodiments of the invention, it is preconfigured for each network or for each pair of a HPLMN and a VPLMN which of the options for cooperative selection is applied. In some embodiments of the invention, HPLMN and VPLMN may dynamically negotiate which option to apply.

If the VPLMN offers a list of candidate resources and the HPLMN selects a resource from VPLMN candidate resources, this allows a fast setup, whereas if the HPLMN may select its own resources without knowledge of the VPLMN resources, the VPLMN need to inform about the selected resources afterwards, which delays the service setup. Therefore, according to some embodiments of the invention, the result of the negotiation may depend on the need of the service requested by the UE.

In some circumstances it might be beneficial that the User plane of the RAN (e.g. eNB or eNB+) being split into control and user plane and the core coming from the same operator are collocated or may even be the same entity (because of less user plane hops, which further decreases the delay). In that case the control plane of the core and the control plane of the RAN may or may not be collocated. But anyhow as described above, to improve interoperability it may be preferable if the interface between the RAN and the Core is the same as the interface within the core networks of two different operators.

In addition, in cases such as services without mobility, the (mobility) control plane in the core is not really needed and the control plane of the RAN can be directly connected to the roaming partner without a dedicated control plane of the core of the VPLMN. Therefore, in some embodiments of the invention, an information element is used indicating that there is no need for mobility. If this information element is detected (or if this information element has a predefined value) the user plane traffic and the control plane traffic is directly exchanged between the eNB and the SGW without further involvement of the MME.

For instance, in the terms of LTE, the MME detecting the information element (or that the information element has the predefined value) may forward the control plane address of the eNB towards the SGW and the control plane address of the SGW towards the enB, so that the MME is bypassed for the control plane in further communication.

The existing APN (Access Point Name) may be reused to identify and address the application to be addressed by the UE.

Introducing the generic parameter DGQ carrying the explicit values of the attributes required by the application doesn't require that each and every new application need to register for a new application ID and/or Service descriptor. The network isn't impacted by the introduction of new IDs and or descriptors every now and then. Thus, new applications can be very quickly deployed. Barriers are turned down and economic progress is enhanced as new applications can be deployed and economy prospers. The operator of an embodiment of this invention may attract new applications and revenue.

The operators may have the freedom to allocate their resource according to the needs from the subscribers, and/or the operator's business needs, and/or operator's policy, and/or costs and/or utilisation level, and/or availability.

In the following, the delay as one of the potential requirements of the service, is explained at greater detail:

In general the delay comprises, at least, the transmission delay (TranD), the processing delay (ProcD), and the propagation delay (PropD).

Propagation Delay (PropD):

This is the delay which is coming from the fact that signals (for instance laser signals) are limited by the speed of light in the transmission medium (e.g. a fibre).

Transmission Delay (TranD):

This delay is induced by the finite bandwidth for the transmission/reception assigned to a resource. For instance if the network knows the potentially available bandwidth of the resource and decides to allocate a higher bandwidth to the candidate resource the transmission delay can be reduced. Thus, related costs may be estimated and optimized.

Processing Delay (ProcD):

This is related to the observation made as mentioned in the prior art, that different virtualisation techniques may lead to different processing delay, not to say that no virtualisation will provide lowest latency.

Since the sum of (at least) these three delays will determine the e2e delay, according to some embodiments of the invention, the selection process may know the so far accumulated delay, the potential delay of candidate resources to be selected with the associated costs, and the delay requirements to be met. In that case the selection process is able to select the resources at the optimal costs.

In order to ensure this, according to some embodiments of the invention, the UE may be able to request a certain maximum delay and/or maximum jitter via the UE DGQ being sent to the RAN (or to any fixed access node in a FMC environment).

Each node participating in service execution (e.g. RAN, AN, MME, SGW, PGW, PGW-C, SGW-C, PGW-U, SGW-U, and CSCF (Proxy CSCF, Interrogating CSCF, Serving CSCF), IBCF, SGSN/GGSN and the BGW or TrGW) may add, if selected, its own contribution to the delay or jitter to the (control plane) signalling, or the selecting node may retrieve the processing delay or jitter associated with the node in question from a database.

For instance, the RAN (normally being selected by the UE) selects an appropriate MME. In some embodiments, RAN informs the MME about the already accumulated delay. This information may comprise the accumulated delay from UE to RAN (i.e., the sum of ProcD, PropD, and TranD). In some embodiments, RAN informs MME on the PropD (which is considered to be substantially fixed between UE and eNB) and informs about ranges of ProcD and TranD it may contribute to service execution. Namely, ProcD and TranD of RAN are not necessarily fixed for the selected RAN. For example, TranD may be adapted by allocating a different bandwidth to the UE-eNB connection, and ProcD may be adapted by selecting an appropriate processor and/or by adapting TTI.

Alternatively, if the RAN didn't/couldn't add its own potential own contributions for ProcD, PropD, TranD (or the total thereof) to the signalling, the MME may retrieve, based on an identification of the individual RAN, the potential ProcD, TranD from a database (internal or external). PropD between UE and eNB may be considered as negligible (or as a constant, e.g. based on the cell radius) in most cases. Furthermore in such a database also the propagation delay (PropD) between two networks nodes may be held or dynamically retrieved, possibly based on an identification of the respective cloud center.

The MME (or a similar/corresponding function in 5G or 3G, etc) receives the UE required delay, the delay indication of the RAN and the candidate delay for the candidate resources possibly to be assigned.

With this approach, the MME is in the position to know the detailed delay requirement from the UE, the already accumulated delay and the potentially available additional further delay of candidate resources for the selection by the MME. E.g, the MME being a selecting node may have access to a database holding the ID's of candidates of SGW/PGW-Us (or similar functions within 3G and/or 5G) with their potential ProcD value, TranD value, and with their associated costs. The SGW/PGW-Us may be a user plane part of the SGW/PGE separated from the control plane or be integrated within a conventional SGW/PGW.

Since the virtualisation of any network function is not explicitly (CUPS, 5G, ETSI NFV, etc) excluded for future architectures, the propagation delay (PropD) between the RAN and the candidate SGW-U/PGW-U may not be fixed at the same value for all the time.

If not fixed, the selection process in the MME is to be made aware of the actual propagation delay between the candidate peers (in this case between the originating RAN and the candidate S/PGW-Us), e.g. based on an identification of the respective cloud center.

However, with the simultaneously consideration of ProcD, PropD and TranD and their associated cost for all the candidates SGW-U/PGW-U, the selection process at the MME may finally select the best one (e.g. based on business needs) of the candidates to still meet the requirement signalled by the UE. Based on this calculation, the corresponding SGW-U/PGW-U instance is requested to be allocated via corresponding control plane signalling towards that/those SGW-U/PGW-U.

In some embodiments, MME may not only allocate an appropriate SGW-U/PGW-U but also determine the TranD and ProcD in the RAN, based on the indication of the available ranges of TranD and ProcD if these ranges are provided by RAN. That is, the MME may instruct the RAN to provide a certain TranD and ProcD such that the overall requirement for the service is substantially fulfilled by the combination of RAN and SGW-U/PGW-U. MMME may instruct RAN e.g. when allocating SGW-U/PGW-U or on successful acknowledgement of that allocation The delay between eNB and the UP in the core may be re-arranged in a similar way. to meet the user requirement for delay (and jitter).

I.e. the MME evaluates the potential delay capabilities of the participating nodes and the potential propagation delay between candidate nodes and allocates individual fractions/portions of the overall delay limit across the involved/selected nodes and resources in the RAN/eNB to meet the requirement at minimal costs.

If, for instance, by chance the UE currently is located close to a candidate virtualized user plane instance, e.g. placed in the cloud and therefore with a comparably higher processing delay (because virtualisation of the user plane in general is increasing the delay compared to a user plane which is not virtualized), the selection process may favour the virtualized user plane as the propagation delay is low in that example.

On the other hand, if the corresponding propagation delay between the RAN and the candidate user plane is relatively high, the selection process may need to select either a virtualized user plane with a lower processing delay compared to the above example or even a user plane, which isn't virtualized at all, and therefore providing minimum processing delay.

It is to be noted that the Transmission delay may be reduced by allocating additional higher bandwidth (than originally requested by the UE) to and from the S/PGW-U, if, by this approach, the needs requested by the UE can be met at reasonable costs for the operator.

As with the delay also the jitter requirement is signalled from the UE to the network. Correspondingly each node (e.g. the RAN or the core) shall add its portion of the jitter associated with the current resources or candidate resources such that the selecting process (e.g. in the MME) is able to estimate the sum of individual jitter contributions of candidate resources being concatenated. Alternatively the jitter of the candidate resources may be retrieved by a database query by the MME. Thus, the MME may select those resources which meet the UE requirements at optimal costs.

The above description is based on the non-roaming use case. In the following the procedure for the roaming use case is provided.

Also in the roaming case, the UE explicitly signals its actual requirements (e.g. delay and/or jitter) towards the network.

In some embodiments of the invention, the VPLMN solely selects its resources (e.g. SGW-U) based on the UE requirements and business needs and signals the selected instance and the currently accumulated delay and/or jitter together with the UE requirement to the HPLMN. Based on this and under consideration of the PropD between the already selected instance and the candidates in the HPLMN, the HPLMN tries to allocate its own resources. This is done by evaluating the candidates within its own network taking into account the accumulated delay and jitter together with the characteristics and costs of the candidate resources (e.g. PGW-Us) in its own network such that the UE requirement are met at reasonable/acceptable/optimal HPLMN costs in accordance with business needs. It cannot be excluded that this leads to solutions which are less optimal or that a solution is not possible at all).

In some embodiments, the VPLMN offers the HPLMN a list of candidate instances of the SGW-U and associated accumulated and/or potential contributions of TranD and ProcD to the delay (like the eNB offered it to the MME in the non-roaming case). These candidates can be considered at the HPLMN, when the HPLMN selects from its own list of PGW-U candidates. This procedure in general would be very similar to the procedure described in the non-roaming case above. I.e., the HPLMN has an overview of the candidates of both VPLMN and HPLMN resources and their individual contributions to TransD and ProcD. Together with the means to calculate the actual propagation delay (see non-roaming case above) between candidate SGW-U and PGW-U peers, the HPLMN may then select from the list of candidates the pair of SGW-U and PGW-U, which meets the UE requirement at optimal/reasonable/acceptable costs in accordance with business needs.

In the next step, the HPLMN signals to the VPLMN the instance selected in the HPLMN as well as the selected instance in the VPLMN (which of course was part of the originally offered list). On receipt of the HPLMN response at the VPLMN the selected instance is configured to interface with the HPLMN. Since, in this case, the final decision is made at the HPLMN, the selection process can pick up the resources from the widest range of possible solutions, this leads to a better overall solution at optimal/reasonable/acceptable costs.

Charging/Accounting

Since in the cooperative selection case potentially sensitive information is exchanged between (potentially competing) operators, the sharing of this information may be rewarded.

For example, the roaming partners may share the revenue inversely proportional (or something similar) to the portion they contribute to the overall delay and/or overall jitter requirement as signalled by the UE. Otherwise, the HPLMN may/could select the high performant and potentially costly resources at the VPLMN at the expense of the VPLMN. However, then the VPLMN may not willing to share this sensitive information and may not want to provide the costly resources if not rewarded for its effort.

Therefore, according to some embodiments of the invention, the actual delay and jitter (etc) contributed by the corresponding operator is added to the charging/accounting records. The corresponding 3GPP charging protocols, such as Gx, Gxx, Gy and Gz etc. may be augmented accordingly. Additionally, the VPLMN may be rewarded also with some kind of base pay for sharing the information.

In some embodiments of the invention, the HPLMN may share the same information of its candidate PGW-Us (as the VPLMN does in the above option) to its VPLMNs at a market place, from which the VPLMN can simultaneously select the best SGW-U and PGW-U pair. However, as this would lead to some kind of broadcast of sensitive information from the HPLMN towards multiple VPLMNs, it is not regarded as the preferred solution, because the broadcasted information is needed in beforehand, without any actual UE request to setup of a connectivity with that HPLMN which performs the broadcast. So, this seems to be unbalanced.

It is known that the selection of VPLMN resources performed by the HPLMN is not in line with the existing procedures today where the VPLMN selects the resources in the HPLMN (4G).

In case of e.g. collapsing the BGW function of the IMS with the PGW-U function (or SGSN/GGSN-U or 5G corresponding unit) of the EPC into one single node, there are further optimisation possibilities. Today, PGW-U and BGW, are clearly separated node functions, which count as two different functions and contribute separately and additionally to e.g. the delay. With decreasing the delay to low and ultralow latency requirements, it becomes more and more attractive to collapse these two functions into one single combined function as this would be only one hop and one node (contributing only about the half to delay and jitter only once) instead of two.

In the above description, the user plane delay and jitter is mainly addressed, because the user plane delay normally is of highest interest for the user experience. However, a corresponding selection mechanism may be applied to the control plane delay and control plane jitter.

Figure 4:
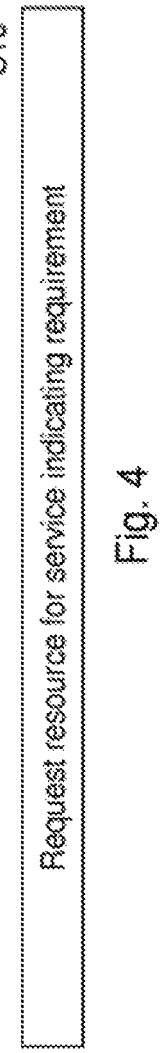
FIG. 4 shows a method according to an embodiment of the invention.
Figure 3:
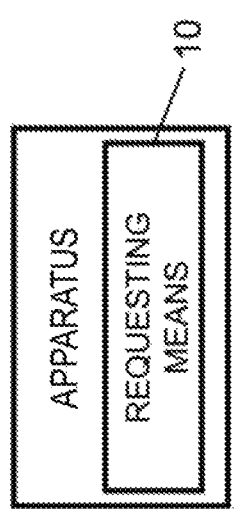
FIG. 3 shows an apparatus according to an embodiment of the invention.

FIG. 3 shows an apparatus according to an embodiment of the invention. The apparatus may be a terminal such as a UE, or an element thereof. FIG. 4 shows a method according to an embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus comprises requesting means 10. The requesting means 10 may be requesting processor.

The requesting processor 10 requests a resource for a service from a network (S10). The request includes a requirement indication indicating a requirement to the resource to be fulfilled for the service. E.g. the requirement indication may be a DGQ. The requirement may be a QoS requirement and/or a SLA requirement.

Figure 6:
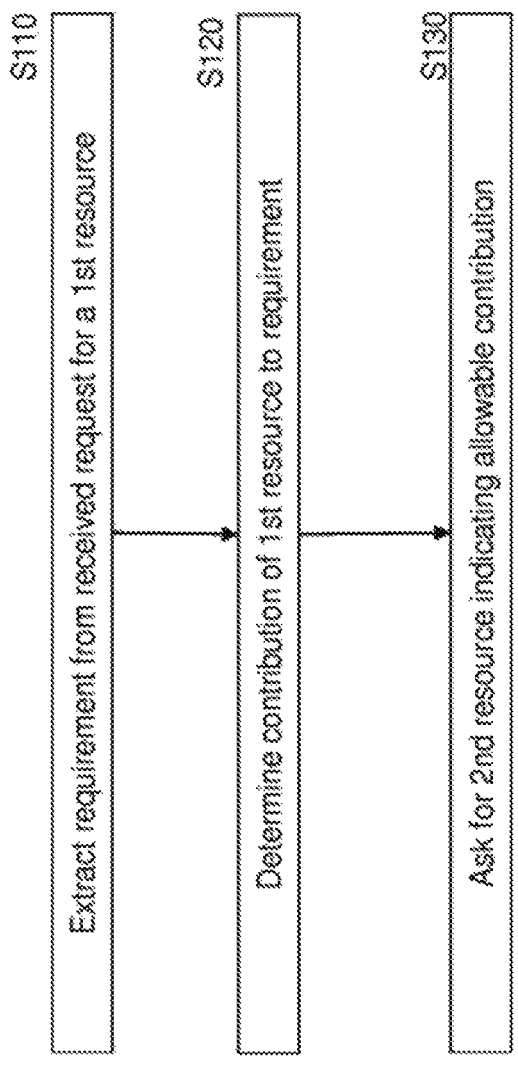
FIG. 6 shows a method according to an embodiment of the invention.
Figure 5:
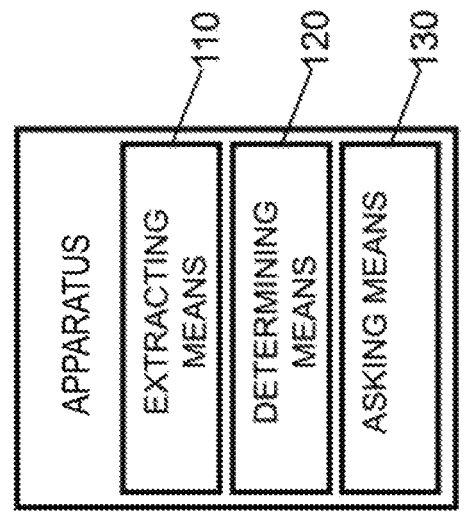
FIG. 5 shows an apparatus according to an embodiment of the invention.

FIG. 5 shows an apparatus according to an embodiment of the invention. The apparatus may be a network function which does not select a resource for the service such as a RAN (represented by eNB), or an element thereof. FIG. 6 shows a method according to an embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises extracting means 110, determining means 120, and asking means 130. The extracting means 110, determining means 120, and asking means 130 may be extracting processor, determining processor, and asking processor, respectively.

The extracting means 110 extracts a requirement from a received request for a first resource for a service (S110). The request comprises a requirement indication, and the requirement indication indicates the requirement to be fulfilled for the service.

The determining means 120 determines a contribution of the first resource to the requirement for a case that a first part of the service is executed by the first resource (S120).

The asking means 130 asks for (i.e. "requests") a second resource for executing a second part of the service (S130). The asking (i.e. the request for the second resource) includes a contribution indication. The contribution indication indicates an allowable contribution to the requirement, that is, how much the second resource may contribute to the requirement. The allowable contribution is based on the requirement and the contribution of the first resource. For example, the allowable contribution may be indicated as the pair of requirement and contribution of the first resource, or the allowable contribution may be indicated as a calculated allowable contribution which is calculated based on the requirement and the contribution of the first resource.

In addition, the apparatus (e.g. an allocating means or allocating processor thereof) may allocate the first resource to the service.

FIG. 7 shows an apparatus according to an embodiment of the invention. The apparatus may be a network function which selects a resource for the service such as a node of a control plane (e.g. MME), or an element thereof. FIG. 8 shows a method according to an embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises extracting means 210, determining means 220, selecting means 230, and allocating means 240. The extracting means 210, determining means 220, selecting means 230, and allocating means 240 may be extracting processor, determining processor, selecting processor, and allocating processor, respectively.

The extracting means 210 extracts a requirement from a received request for a resource for a service (S210). The request comprises a requirement indication, and the requirement indication indicates the requirement to be fulfilled for the service.

For each of plural resources, the determining means 220 determines a respective contribution to the requirement for a case that at least a first part of the service is executed on the respective resource (S220). That is, under the assumption that at least a first part of the service is executed on the respective resource, the determining means 220 determines the contribution to the requirement caused by the respective resource.

The selecting means 230 selects one of the plural resources such that a discrepancy between the requirement and the respective contribution is within a predetermined limit (S230), i.e. such that the contribution fits to the requirement. Then, the allocating means 240 allocates the selected resource to the service (S240).

FIG. 9 shows an apparatus according to an embodiment of the invention. The apparatus may be a network function which selects a resource for the service such as a node of a control plane (e.g. MME), or an element thereof. FIG. 10 shows a method according to an embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises first extracting means 310, inviting means 320, second extracting means 330, determining means 340, selecting means 350, and allocating means 360. The first extracting means 310, inviting means 320, second extracting means 330, determining means 340, selecting means 350, and allocating means 360 may be first extracting processor, inviting processor, second extracting processor, determining processor, selecting processor, and allocating processor, respectively.

The first extracting means 310 extracts a requirement from a received request for a first resource for a service (S310). The request comprises a requirement indication, and the requirement indication indicates the requirement to be fulfilled for the service.

The inviting means 320 invites (i.e. "requests") a selecting device to allocate a second resource to the service for executing a second part of the service (S320). The invitation comprises the requirement indication. The selecting device may be e.g. a MME or another control device.

The second extracting means 330 extracts a second contribution indication from a response to the invitation (S330). The second contribution indication indicates a contribution of the second resource if the second part of the service is executed on the second resource.

The determining means 340 determines, for each of plural first resources, a respective first contribution to the requirement for a case that at least a first part of the service is executed on the respective first resource (S340). Each of the first resources may be different from the second resource. That is, the second resource may be under control of the selecting device, while the first resources may be under control of the apparatus.

The selecting means 350 selects one of the plural first resources such that a discrepancy between the requirement and a total of the respective first contribution and the second contribution is within a predetermined limit (S350). The total of the contributions may be calculated depending on the kind of contribution. E.g. delays may be added, while probabilities or the inverse of probabilities (such as packet loss) may be multiplied. A total of two bandwidths may be the minimum of the two bandwidths.

The allocating means 360 allocates the selected first resource to the service (S360). Typically, the selection function of the first resources (selecting means 350) may send information about the selected first resource to a selection function of the second resources so that the allocated first and second resources know each other and can exchange payload (can communicate with each other).

FIG. 11 shows an apparatus according to an embodiment of the invention. The apparatus comprises at least one processor 610, at least one memory 620 including computer program code, and the at least one processor 610, with the at least one memory 620 and the computer program code, being arranged to cause the apparatus to at least perform at least one of the methods according to FIGS. 4, 6, 8, and 10.

Embodiments of the invention may be employed in a 3GPP network such as LTE or LTE-A, or in a 5G network. They may be employed also in other wireless or wireline communication networks such as CDMA, EDGE, UTRAN networks, WiFi networks, etc.

A terminal may be any apparatus capable to access the respective network. E.g., in 3GPP networks, a terminal may be a UE, a M2M device, a computer/notebook, fixed telephone, etc. The terminal may be a smartphone, a laptop, a mobile phone etc.

Some embodiments of the invention are described where the UE defines the overall requirement, which is then split into partial requirements e.g. on RAN and core (or VPLMN and HPLMN etc.). However, the concept may be cascaded. E.g., VPLMN may provide a requirement to HPLMN, wherein this requirement is a result of the overall requirement from the UE and the contribution from VPLMN. HPLMN may then consider the requirement received from VPLMN as an overall requirement in the same way as an overall requirement received from a UE attached to HPLMN.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. One or more of the described entities may be implemented in the cloud. In particular, each of the described entities may be implemented as a network slice.

According to the above description, it should thus be apparent that example embodiments of the present invention provide, for example a terminal such as a user equipment, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example an access node such as a base station (e.g. NodeB or eNodeB), or a component thereof, an apparatus embodying the same, a method for controlling and/or operating the same, and computer program(s) controlling and/or operating the same as well as mediums carrying such computer program(s) and forming computer program product(s).

According to the above description, it should thus be apparent that example embodiments of the present invention provide, for example a control device such as a MME, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. They may be implemented fully or partly in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus, comprising at least one processor, at least one memory including computer program code, and the at least one processor, with the at least one memory and the computer program code, being arranged to cause the apparatus to at least perform at least receiving, at the processor, a request from a user equipment for a first network slice for a service, wherein the request comprises a requirement indication, and the requirement indication indicates the requirement to be fulfilled for the service;

extracting the requirement received at the processor;

determining, at the processor, a contribution of the first network slice to the requirement requested from the user equipment, where the contribution comprises a first part of the service that is executed on the first network slice;

requesting, at the processor, a second network slice for executing a second part of the service, wherein the request includes a contribution indication, the contribution indication indicating an allowable contribution to the requirement, and the allowable contribution is based on the requirement and the contribution of the first network slice.

2. The apparatus according to claim 1, wherein the at least one memory and the computer program code, is arranged to cause the apparatus to further perform determining, at the processor, for each of plural first network slices for the service, a respective contribution of the respective first network slice to the requirement requested by the user equipment, where the first part of the service is executed on the respective first network slice; wherein the requesting for the second network slice includes one or more contribution indicator pairs each comprising an identification of a respective first network slice of the plural first network slices and a respective contribution indication, and each of the contribution indications is based on the requirement and the contribution of the respective first network slice.

3. The apparatus according to claim 2, wherein the at least one memory and the computer program code, is arranged to cause the apparatus to further perform checking, for each of the plural first network slices, based on the respective contribution, if the requirement for the service can be fulfilled by the respective first network slice;

inhibiting, for each of the plural first network slices, that the requesting for the second network slice includes the contribution indicator pair comprising the identification of the respective first network slice if the requirement for the service cannot be fulfilled by the respective first network slice.

4. The apparatus according to claim 2, wherein the at least one memory and the computer program code, is arranged to cause the apparatus to further perform monitoring if a received response to the requesting for the second network slice comprises the identification of a selected one of the first network slices;

allocating the selected one of the first network slices to the service if the response comprises the identification of the selected one of the first network slices.

5. The apparatus according to claim 2, wherein at least one of the allowable contribution is indicated in the contribution indication by the requirement and the contribution of the first network slice; and the at least one memory and the computer program code, is arranged to cause the apparatus to further perform calculating the allowable contribution based on the requirement and the contribution of the first network slice, and the contribution indication comprises the calculated allowable contribution.

6. The apparatus according to claim 2, wherein the at least one memory and the computer program code, is arranged to cause the apparatus to further perform checking if the contribution of the first network slice allows fulfilling the requirement;

allocating the first network slice to the service if the contribution of the first network slice allows fulfilling the requirement.

7. The apparatus according to claim 6, wherein the at least one memory and the computer program code, is arranged to cause the apparatus to further perform providing an outgoing impossibility indication in response to the request for the first network slice if the contribution of the first network slice does not allow fulfilling the requirement.

8. The apparatus according to claim 2, wherein the at least one memory and the computer program code, is arranged to cause the apparatus to further perform monitoring if, in response to the request for the second network slice, an incoming impossibility indication is received, wherein the incoming impossibility indication indicates that the second network slice exceeds the allowable contribution;

determining a contribution of a third network slice to the requirement for a case that the second part of the service is executed on the third network slice;

checking if the contribution of the third network slice exceeds the allowable contribution;

allocating the third network slice to the service if the contribution of the third network slice does not exceed the allowable contribution and the incoming impossibility indication is received.

9. Method, comprising
receiving, at the processor, a request from a user equipment for a first network slice for a service, wherein the request comprises a requirement indication, and the requirement indication indicates the requirement to be fulfilled for the service;
extracting, at the processor, the requirement from the request received from the user equipment;
determining a contribution of the first network slice to the requirement requested from the user equipment, where the contribution comprises a first part of the service that is executed on the first resource;
requesting, at the processor, a second network slice for executing a second part of the service, wherein the request includes a contribution indication, the contribution indication indicating an allowable contribution to the requirement, and the allowable contribution is based on the requirement and the contribution of the first network slice.

10. The method according to claim 9, further comprising
determining, at the processor, for each of plural first network slices for the service, a respective contribution of the respective first network slice to the requirement for a case that the first part of the service is executed on the respective first network slice; wherein
the requesting for the second network slice includes one or more contribution indicator pairs each comprising an identification of a respective first network slice of the plural first network slices and a respective contribution indication, and each of the contribution indications is based on the requirement and the contribution of the respective first network slice.

11. The method according to claim 10, further comprising
checking, for each of the plural first network slices, based on the respective contribution, if the requirement for the service can be fulfilled by the respective first network slice;
inhibiting, for each of the plural first network slice, that the asking for the second network slice includes the contribution indicator pair comprising the identification of the respective first network slice if the requirement for the service cannot be fulfilled by the respective first network slice.

12. The method according to claim 10, further comprising
monitoring if a received response to the asking for the second network slice comprises the identification of a selected one of the first network slices;
allocating the selected one of the first network slices to the service if the response comprises the identification of the selected one of the first network slice.

13. The method according to claim 10, wherein at least one of
the allowable contribution is indicated in the contribution indication by the requirement and the contribution of the first network slice; and
the method further comprises calculating the allowable contribution based on the requirement and the contribution of the first network slice, and the contribution indication comprises the calculated allowable contribution.

14. The method according to claim 10, further comprising
checking if the contribution of the first network slice allows fulfilling the requirement;
allocating the first network slice to the service if the contribution of the first network slice allows fulfilling the requirement.

15. The method according to claim 14, further comprising
providing an outgoing impossibility indication in response to the request for the first network slice if the contribution of the first network slice does not allow fulfilling the requirement.

16. The method according to claim 10, further comprising
monitoring if, in response to the request for the second network slice, an incoming impossibility indication is received, wherein the incoming impossibility indication indicates that the second network slice exceeds the allowable contribution;
determining a contribution of a third network slice to the requirement for a case that the second part of the service is executed on the third network slice;
checking if the contribution of the third network exceeds the allowable contribution;
allocating the third network slice to the service if the contribution of the third network slice does not exceed the allowable contribution and the incoming impossibility indication is received.

17. A computer program product comprising a set of instructions which, when executed on an apparatus, is configured to cause the apparatus to carry out the method according to claim 9.

18. The computer program product according to claim 17, embodied as a computer-readable medium or directly loadable into a computer.

* * * * *